(12) United States Patent
Oh et al.

(10) Patent No.: US 10,458,025 B2
(45) Date of Patent: Oct. 29, 2019

(54) MOISTURE REMOVING APPARATUS USING ELECTRIC DISCHARGE

(71) Applicants: HYUNDAI MOTOR COMPANY, Seoul (KR); KIA Motors Corporation, Seoul (KR)

(72) Inventors: Man Ju Oh, Yongin-si (KR); Sang Shin Lee, Suwon-si (KR); Jae Woo Park, Ansan-si (KR); So Yoon Park, Suwon-si (KR); Jae Woong Kim, Hwaseong-si (KR); So La Chung, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 260 days.

(21) Appl. No.: 15/473,136

(22) Filed: Mar. 29, 2017

(65) Prior Publication Data
US 2018/0127884 A1    May 10, 2018

(30) Foreign Application Priority Data
Nov. 9, 2016 (KR) .................. 10-2016-0148691

(51) Int. Cl.
*C25B 1/06* (2006.01)
*B60R 16/023* (2006.01)
(Continued)

(52) U.S. Cl.
CPC ............ *C25B 1/06* (2013.01); *B60R 16/0237* (2013.01); *C25B 11/03* (2013.01);
(Continued)

(58) Field of Classification Search
CPC combination set(s) only.
See application file for complete search history.

(56) References Cited

U.S. PATENT DOCUMENTS

| 2008/0047907 A1* | 2/2008 | Herzog .................. B09C 1/002 210/760 |
| 2012/0230879 A1* | 9/2012 | Dunkley ................ A61L 2/202 422/186 |

(Continued)

FOREIGN PATENT DOCUMENTS

KR    10-2014-0006164 A    1/2014

*Primary Examiner* — Xiuyu Tai
(74) *Attorney, Agent, or Firm* — Knobbe Martens Olson & Bear LLP

(57) ABSTRACT

Disclosed is a case for electric devices having a moisture removing apparatus inside. The apparatus includes a first electrode exposed in an inside of a casing having an electronic circuit board therein, connected to one electrode of a power source, and coated with a dielectric material on a surface thereof. The apparatus includes a second electrode exposed in the inside of the casing having the electronic circuit board therein, connected to a remaining electrode of the power source, and spaced apart from the first electrode so as to define a space therebetween. The apparatus includes an electric discharge air path provided between the surface of the first electrode coated with the dielectric material and the second electrode, and in which moisture of air is decomposed by electric discharge occurring between the first and second electrodes while air inside the casing circulates in the electric discharge air path.

12 Claims, 6 Drawing Sheets

(51) Int. Cl.
*C25B 11/04* (2006.01)
*C25B 15/00* (2006.01)
*C25B 11/03* (2006.01)

(52) U.S. Cl.
CPC .......... *C25B 11/0405* (2013.01); *C25B 15/00* (2013.01); *B60R 16/0239* (2013.01); *Y02E 60/366* (2013.01)

(56) References Cited

U.S. PATENT DOCUMENTS

2015/0259203 A1* 9/2015 Costello .................. C01B 13/11
   204/176
2017/0065069 A1* 3/2017 Subramaniam Anantha ...............
   A46D 1/0207

* cited by examiner

MOISTURE REMOVING APPARATUS USING ELECTRIC DISCHARGE

CROSS REFERENCE TO RELATED APPLICATION

The present application claims priority to Korean Patent Application No. 10-2016-0148691, filed on Nov. 9, 2016, the entire contents of which is incorporated herein for all purposes by this reference.

BACKGROUND

Field

The present disclosure relates generally to a moisture removing apparatus using electric discharge. More particularly, the present disclosure relates to a moisture removing apparatus using electric discharge, the apparatus using electrolysis to fundamentally remove moisture condensed in an electric device.

Description of the Related Art

In general, exposure of an electronic device to moisture has a negative effect on reliability of operation of the electronic device. Therefore, it is very important to prevent the electronic device from being exposed to moisture, or to quickly remove moisture when exposed to moisture.

In particular, since electronic devices used more in outdoor spaces than in indoor spaces are more likely to be exposed to moisture, blocking and removing of moisture are more important.

For example, an electronic device mounted on a vehicle is used in an environment where an operating condition is very poor. The electronic device of the vehicle is exposed to changes in outside temperature, a high heat source such as an engine, and continuous vibrations during vehicle operation. In addition, the electronic device of the vehicle is directly exposed to moisture depending on driving conditions such as when it rains or when water is on the road.

In order to solve the above problems, there has been proposed a technique in which a casing of the electronic device of the vehicle is subjected to waterproofing and sealing. However, there is a problem in that waterproofed and sealed casing can be damaged by an accident. In addition, when the casing is opened for maintenance, other problems may occur.

The foregoing is intended merely to aid in the understanding of the background of the present invention, and is not intended to mean that the present invention falls within the purview of the related art that is already known to those skilled in the art.

The disclosure of this section is to provide background of the invention. Applicant notes that this section may contain information available before this application. However, by providing this section, Applicant does not admit that any information contained in this section constitutes prior art.

SUMMARY

Accordingly, the present disclosure has been made keeping in mind the above problems occurring in the related art, and the present disclosure proposes a moisture removing apparatus using electric discharge, the apparatus being capable of electrolytically removing moisture that may be present inside a casing of an electronic device or may be introduced inside the casing of the electronic device due to maintenance or an accident, whereby the electronic device can be prevented from being damaged due to moisture.

In order to achieve the above object, according to one aspect of the present invention, there is provided a moisture removing apparatus using electric discharge, the apparatus including: a first electrode exposed in an inside of a casing having an electronic circuit board therein, connected to one electrode of a power source, and coated with a dielectric material on a surface thereof; a second electrode exposed in the inside of the casing having the electronic circuit board therein, connected to a remaining electrode of the power source, and spaced apart from the first electrode so as to define a space therebetween; and an electric discharge air path provided between the surface of the first electrode coated with the dielectric material and the second electrode, and in which moisture of air is decomposed by electric discharge occurring between the first and second electrodes while air inside the casing circulates in the electric discharge air path.

Each of the first and second electrodes and the electric discharge air path may be provided in plural.

The first and second electrodes may be provided parallel to each other in a plate shape.

The first and second electrodes may be connected to the power source through the electric circuit board.

The apparatus may further include a condensation cover provided in the casing at a position where the first and second electrodes are arranged, the condensation cover thermally connecting an outside and the inside of the casing to each other, and being made of a material having higher thermal conductivity than that of the casing.

A radiation fin may be provided on the condensation cover, such that the radiation fin is exposed to an outside of the casing.

The condensation cover may be made of a metal.

The apparatus may further include a housing locking edges of the first and second electrodes so that the plurality of first and second electrodes are arranged alternately to be parallel to each other.

The housing may be provided with a first leg connected both to the first electrode and to the one electrode of the power source, and a second leg connected both to the second electrode and to the remaining electrode of the power source.

Each of the first and second electrodes may be provided with a plurality of ventilation holes.

The ventilation holes of the first and second electrodes may be arranged alternately to be offset from each other.

The dielectric material may be an ionomer.

The dielectric material may be made by impregnating a polytetrafluoroethylene (PTFE) membrane with an ionomer.

According to a moisture removing apparatus using electric discharge with the above-described configuration, it is possible to prevent damage to the electronic device due to moisture by electrolytically removing moisture that may be present inside the casing of the electronic device or may be introduced inside the casing of the electronic device when the casing of the electronic device is opened for maintenance or is damaged by an accident.

BRIEF DESCRIPTION OF THE DRAWINGS

Features and advantages of the present invention will be more clearly understood from the following detailed description when taken in conjunction with the accompanying drawings, in which.

DETAILED DESCRIPTION OF THE INVENTION

Figure 1:
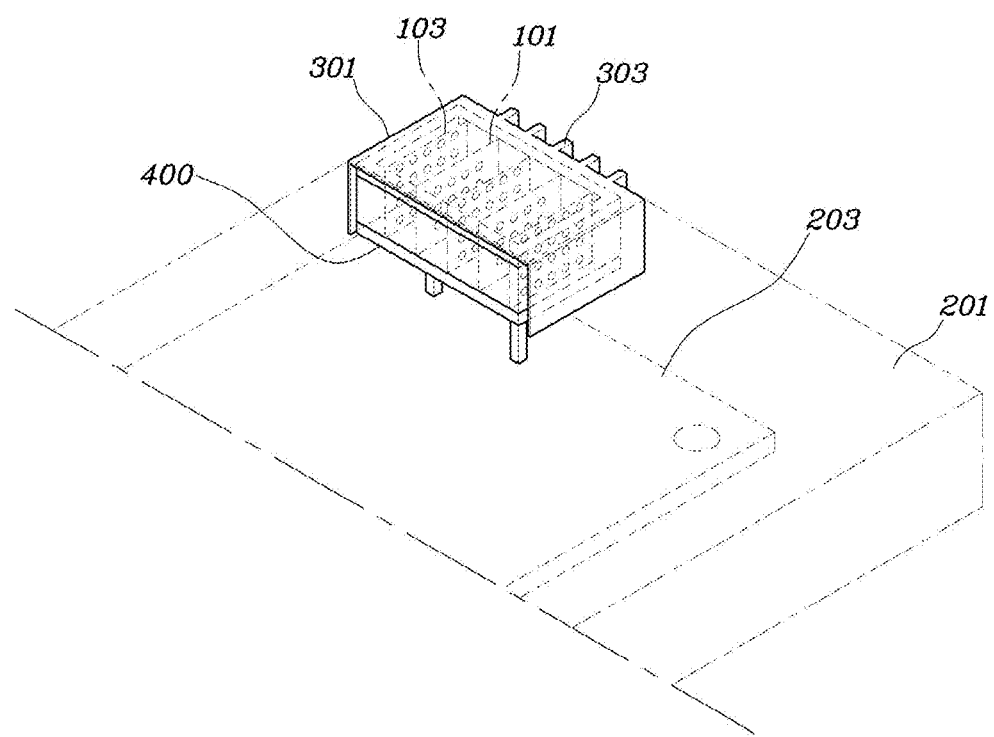
FIGS. 1 and 2 are views schematically showing a moisture removing apparatus using electric discharge according to an embodiment of the present invention.

Hereinbelow, embodiments of the present invention will be described in detail with reference to the accompanying drawings. Throughout the drawings, the same reference numerals will refer to the same or like parts.

An aspect of the present invention discloses a case for housing electric devices in a vehicle. The case provides sealing to prevent moisture from outside of the case and protect the electric device from moisture. In embodiments of the invention, a humidity removal device is provided inside the case an. For efficient removal of humidity, a mechanism to collect humidity near the humidity removal device is provided as well. In embodiments of the present invention, humidity inside the case is collected to a portion of the case that has relatively low temperature when compared to the other portion of the case.

In embodiments, a case includes a first portion 301 made of a first material and a second portion 201 made of second material. The first material has a thermal conductivity higher than the end of the second material. The first portion (condensation cover) 301 includes at least one fin 303 for cooling on its outside surface. Due to its higher thermal conductivity and cooling fin 303, the first portion 301 of the case has a temperature lower than that of the second portion 201 of the case. Accordingly, humidity inside the case can be attracted nearby the first portion 301 and condensed on an inside surface (opposite to the outside surface where fin 303 is formed) of the first portion 301 facing frame 400 and electrodes 101, 103 of the humidity removal device.

In embodiments, in a cross-sectional view (FIG. 5), an electrolysis humidity removal device is provided in an inner space of the condensation cover 301 such that humidity condensed on an inner surface of the condensation cover 301 can be removed efficiently by electrolysis between electrodes 101, 103 of the humidity remover device. In some embodiments, frame 400 of humidity remover device is supported by legs 401, 403 connected to electric circuit board 203 and elevated into the inner space of the condensation cover 301 but does not contact with the first portion 301 as illustrated in FIG. 5.

Figure 2:
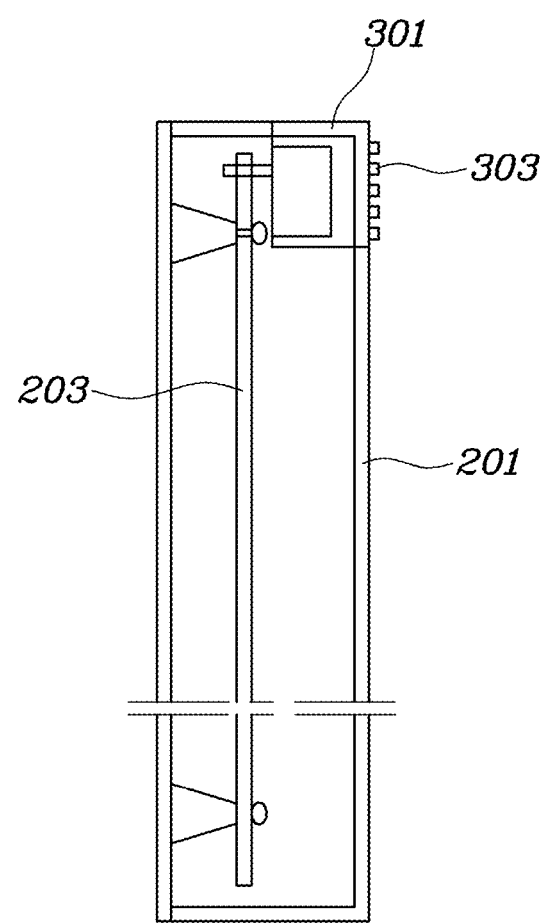
Figure 3:
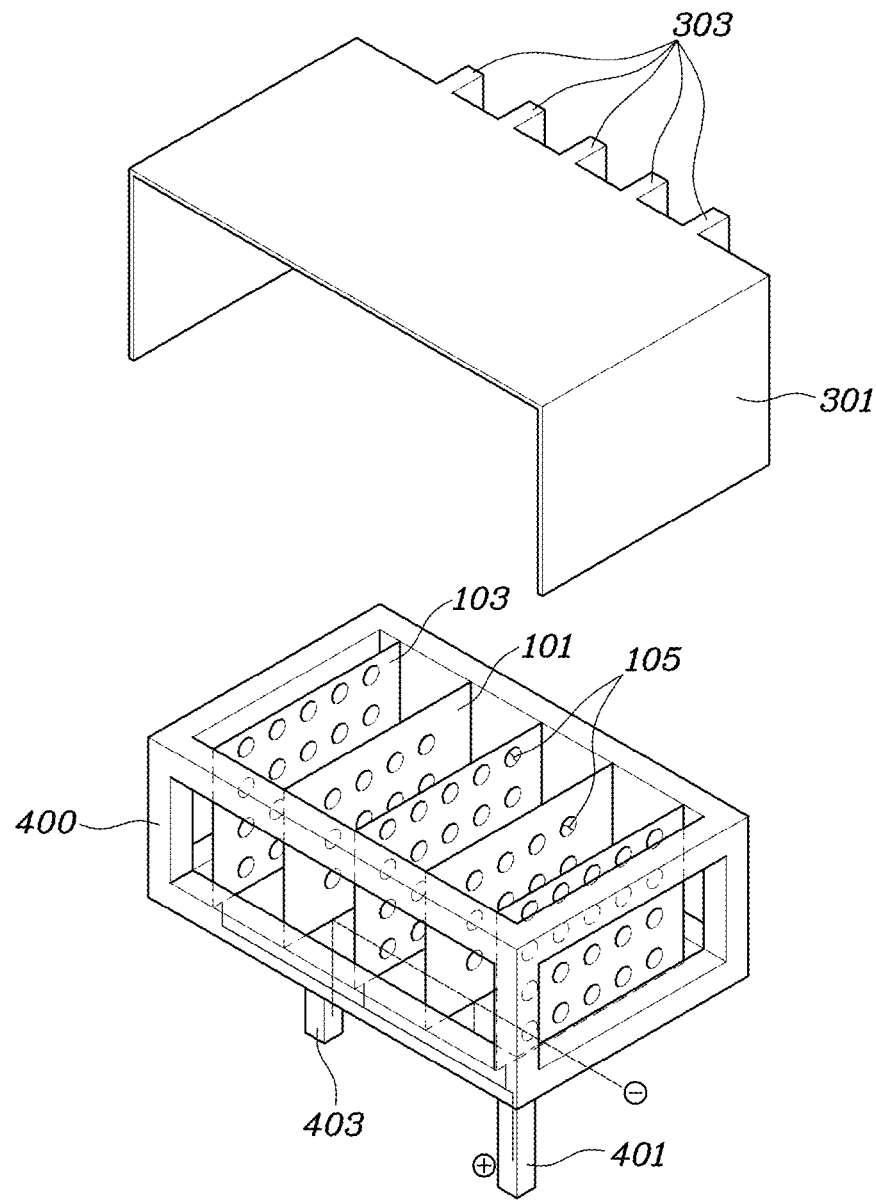
FIG. 3 is an exploded schematic view showing a moisture removing apparatus using electric discharge according to an embodiment of the present invention.
Figure 4:
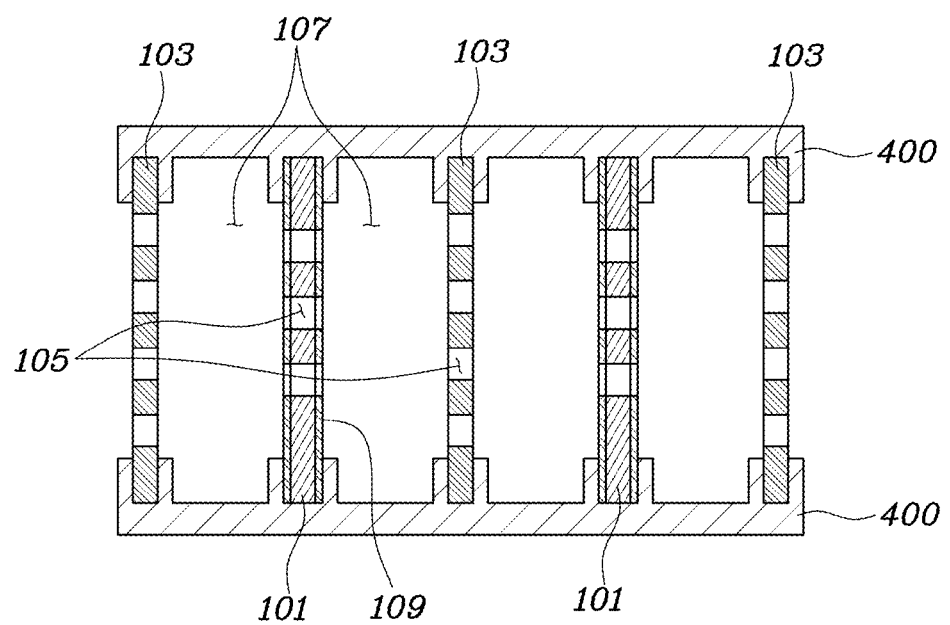
FIGS. 4 and 5 are cross-sectional views showing a moisture removing apparatus using electric discharge according to an embodiment of the present invention.
Figure 5:
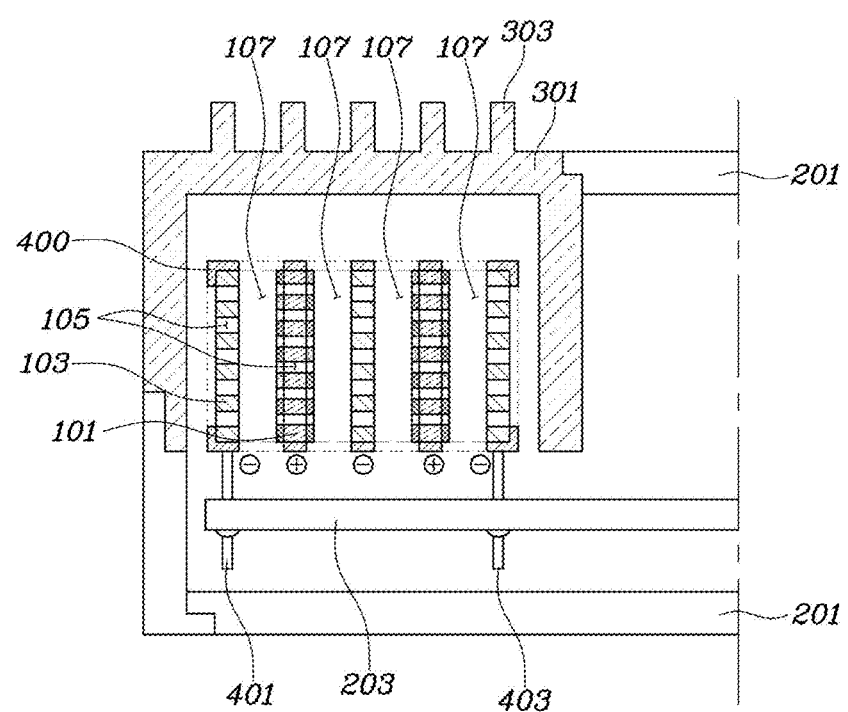
Figure 6:
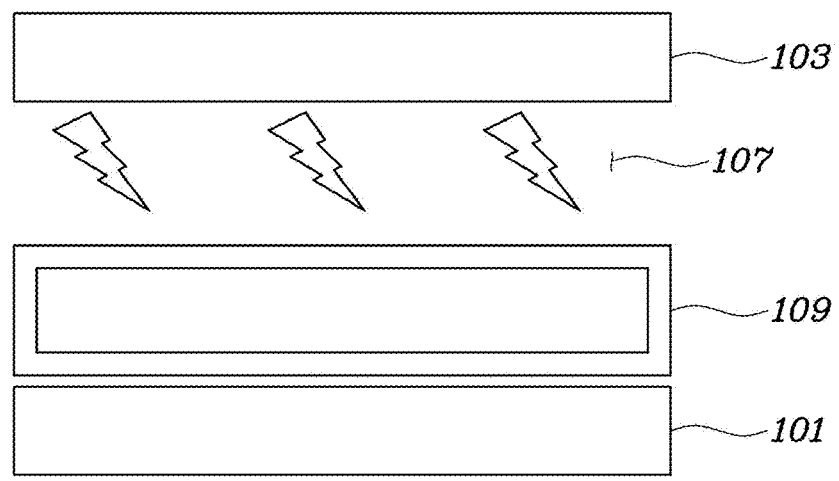
FIG. 6 is a view showing working mechanism of a moisture removing apparatus using electric discharge according to an embodiment of the present invention.

FIGS. 1 and 2 are views schematically showing a moisture removing apparatus using electric discharge according to an embodiment of the present invention, FIG. 3 is an exploded schematic view showing a moisture removing apparatus using electric discharge according to an embodiment of the present invention, FIGS. 4 and 5 are cross-sectional views showing a moisture removing apparatus using electric discharge according to an embodiment of the present invention, and FIG. 6 is a view showing working mechanism of a moisture removing apparatus using electric discharge according to an embodiment of the present invention.

A moisture removing apparatus using electric discharge according to embodiments of the present invention includes: a first electrode 101 exposed in an inside of a casing 201 having an electronic circuit board 203 therein, connected to one electrode of a power source, and coated with a dielectric material 109 on a surface thereof; a second electrode 103 exposed in the inside of the casing having the electronic circuit board therein, connected to a remaining electrode of the power source, and spaced apart from the first electrode so as to define a space therebetween; and an electric discharge air path 107 provided between the surface of the first electrode 101 coated with the dielectric material 109 and the second electrode 103, and in which moisture of air is decomposed by electric discharge occurring between the first and second electrodes 101 and 103 while air inside the casing 201 circulates in the electric discharge air path 107.

Each of the first and second electrodes 101 and 103 and the electric discharge air path 107 may be provided in plural. The first and second electrodes 101 and 103 may be provided parallel to each other in a plate shape.

In general, exposure of an electronic device to moisture has a negative effect on reliability of an operation of the electronic device. Therefore, it is very important to prevent the electronic device from being exposed to moisture, or to remove moisture quickly when the electronic device is exposed to moisture.

In particular, as electronic devices used more in outdoor spaces than in the indoor spaces are more likely to be exposed to moisture, blocking and removing of moisture in the electronic devices become more important. Accordingly, in the present disclosure, various electronic devices mounted on a vehicle will be described as a representative example thereof.

For example, an electronic device mounted on a vehicle is used in an environment where an operating condition is very poor. The electronic device of the vehicle is exposed to changes in outside temperature, a high heat source such as an engine, and continuous vibrations during vehicle operation. In addition, the electronic device of the vehicle is directly exposed to moisture depending on driving conditions such as when it rains or when water is on the road.

In order to protect the electronic device of the vehicle from this, there is a technique in which a casing 201 is subjected to waterproofing and sealing, whereafter the electronic device is assembled in a dry environment. However, the waterproofed and sealed casing 201 can be damaged by an accident, and when the casing 201 needs to be opened for maintenance, other problems may occur. Thus, it is desirable that the electronic device has a function to remove moisture inside the casing 201.

There are two ways to lower humidity in the air. One is to lower relative humidity by raising temperature of air, and the other way is to lower absolute humidity by removing moisture from air. A method of lowering the relative humidity cannot be a fundamental solution since moisture is condensed again inside the electronic device when temperature inside the casing 201 of the electronic device is decreased. Thus, an aspect of the present invention is to fundamentally remove moisture inside the casing 201 of the electronic device by electrolysis.

In general, electrolysis of water is performed by providing electrodes in water containing electrolytes. However, when the amount of water inside the casing 201 of the electronic device is not sufficient to conduct electricity, it may be difficult to perform electrolysis in a conventional way.

Accordingly, an aspect of the present invention is to decompose moisture in the air inside the casing 201 of the electronic device by inducing electric discharge at low voltage.

With reference to FIGS. 1 to 6, the first electrode 101 is connected to the one electrode of the power source and is arranged to be exposed inside the casing 201, whereafter the second electrode 103 is arranged to be spaced apart from the first electrode 101 by a predetermined distance. Basically, electric current flows in a connected conducting wire, but if high voltage is applied to disconnected wires, electric discharge occurs in which electrons are transferred by passing through an empty space between the disconnected wires. However, it is not easy to ensure high voltage in a vehicle sufficient to induce electric discharge. In addition, it is not desirable to induce electric discharge through high voltage in a vehicle in which a plurality of electronic components exists, and thus it is required that electric discharge occur at low voltage.

This is the role of the dielectric material 109 coated on the first electrode 101. The dielectric material 109 functions to allow electric discharge to occur uniformly over an entire surface of the first and second electrodes 101 and 103 and to facilitate emission of electrons, thereby inducing electric discharge even at low voltage.

The first and second electrodes 101 and 103 are spaced apart from each other so as to define the space between the surface of the first electrode 101 coated with the dielectric material 109 and the second electrode 103, thereby providing the electric discharge air path 107 in which air inside the casing 201 can flow. Accordingly, electric discharge occurs in the electric discharge air path 107 while air inside the casing 201 circulates in the electric discharge path 107, whereby moisture of the air inside the casing 201 is decomposed by electrolysis. Thus, absolute humidity of the air inside the casing 201 can be reduced.

The apparatus may be further provided with a condensation cover 301 provided in the casing 201 at a position where the first and second electrodes 101 and 103 are arranged. The condensation cover 301 may be made of a material having higher thermal conductivity than that of the casing 201 and may thermally connect an outer space and an inner space of the casing 201 to each other. Here, a radiation fin 303 may be provided on the condensation cover 300, such that the radiation fin is exposed to an outside of the casing 201. The condensation cover 301 may be made of a metal.

If a moisture removing apparatus using electric discharge according to embodiments of the present invention continuously removes moisture, moisture inside the casing 201 will be uniformly diffused, thereby reducing overall humidity inside the casing 201. However, if moisture inside the casing 201 can be concentrated at a place where the apparatus according to embodiments of the present invention is provided, the moisture can be removed more quickly.

Accordingly, as shown in FIGS. 1 to 5, embodiments of the present invention provides the condensation cover 301 that thermally connects the outside and the inside of the casing 201 to each other, and is made of the material having high thermal conductivity. The reason why the condensation cover 301 is made of the material having high thermal conductivity is to lower temperature of the condensation cover 301 more easily than the casing 201, and thus moisture inside the casing 201 can be condensed on a surface of the condensation cover 301 lowered in temperature. Accordingly, the condensed moisture can be quickly removed by the apparatus according to embodiments of the present invention. In addition, the radiation fin 303 is provided on the condensation cover 301 such that a temperature of the condensation cover 301 can be more easily lowered than that of the casing 201, and thus temperature difference with the casing 201 is increased, whereby moisture inside the casing 201 can be quickly condensed on the condensation cover 301.

The first and second electrodes 101 and 103 may be connected to the power source through the electronic circuit board 203.

Embodiments of the present invention is further provided with a housing 400 that locks edges of the first and second electrodes 101 and 103 so that the plurality of first and second electrodes 101 and 103 are arranged alternately to be parallel to each other. Here, the housing 400 may be provided with a first leg 401 connected both to the first electrode 101 and to the one electrode of the power source, and a second leg 403 connected both to the second electrode 103 and to the remaining electrode of the power source.

The plurality of first and second electrodes 101 and 103 may be directly connected to the power source. However, embodiments of the present invention, as shown in FIGS. 3 to 5, the plurality of first and second electrodes 101 and 103 are arranged to be locked by the housing 400, and the first and second electrodes 101 and 103 are connected to the first and second legs 401 and 403 of the housing 400 respectively, whereby a moisture removal apparatus using electric discharge is modularized.

As such, if the first and second legs 401 and 403 of the housing 400 are connected to the electronic circuit board 203, whereafter the first and second electrodes 101 and 103 are supplied with power electricity through the electronic circuit board 203, a moisture removing apparatus using electric discharge according to embodiments of the present invention can be more easily installed.

Thus, if a power supply circuit is additionally provided on the electronic circuit board, the apparatus can be easily mounted on various electronic devices.

Each of the first and second electrodes 101 and 103 may be provided with a plurality of ventilation holes 105. Here, the ventilation holes 105 of the first and second electrodes 101 and 103 may be arranged alternately to be offset from each other.

The electric discharge air path 107 provided between the first and second electrodes 101 and 103 is narrow in width. Accordingly, when a distance between the first and second electrodes 101 and 103 is increased, the amount of air, which is a nonconductive material, is increased, thereby resulting in an increase in electric resistance. Thus, it is difficult to perform electric discharge at low voltage. Accordingly, the distance between the first and second electrodes 101 and 103 is determined to be equal to or less than several millimeters. In this case, air inside the casing 201 may not efficiently flow to the electric discharge air path 107.

Accordingly, in embodiments of the present invention, as shown in FIGS. 4 and 5, each of the first and second electrodes 101 and 103 itself is provided with the ventilation holes 105 so that air inside the casing 201 can be efficiently fed to the electric discharge air path 107. In addition, the ventilation holes 105 provided in the first and second electrodes 101 and 103 are arranged alternately to be offset from each other rather than being aligned with each other, thereby increasing the time period for which air introduced through the ventilation holes 105 stays in the electric discharge air path 107. Thus, moisture of the air inside the casing 201 can be efficiently decomposed for a sufficient time.

The dielectric material 109 may be an ionomer.

The dielectric material 109 enables electric discharge to occur at low voltage by helping movement of electrons.

The ionomer denotes a polymer that comprises a cationic group or an anionic group. Specifically explained, the ionomer is a thermoplastic material having covalent bonding and ionic bonding at the same time, and has very excellent electrostatic force. Fundamentally, it has properties of the dielectric material 109 and an insulator as a polymer plastic material, but it plays a role of helping movement of electrons on the basis of excellent electrostatic force to enable electric discharge at low voltage.

The dielectric material 109 may be made by impregnating a polytetrafluoroethylene (PTFE) membrane with the ionomer.

The dielectric material 109 described above is indispensably required to have durability to maintain performance even when exposed to various temperature changes, moisture, and vibration for a long time when the apparatus is used for the electronic device mounted on a vehicle.

Thus, in embodiment of the present invention, PTFE having excellent coating adhesion while chemical properties are retained at a high temperature (equal to or greater than 300$r$), namely a porous Teflon membrane, is impregnated with the ionomer and thus coated on the electrode. Due to this, it is possible to improve durability of coating of the dielectric material 109 while maintaining excellent electrostatic force of the ionomer.

Although embodiments of the present invention have been described for illustrative purposes, those skilled in the art will appreciate that various modifications, additions and substitutions are possible.

What is claimed is:

1. A moisture removing apparatus using electric discharge, the apparatus comprising:
    a casing comprising an opening;
    a condensation cover configured to cover the opening such that the casing and the condensation cover are configured to form an enclosure together for containing an electric circuit board;
    a first electrode disposed within the enclosure, connected to one electrode of a power source, and coated with a dielectric material on a surface thereof; and
    a second electrode disposed within the enclosure, connected to a remaining electrode of the power source, and spaced apart from the first electrode so as to define an electric discharge air path between the first electrode and the second electrode,
    wherein the electric discharge air path is provided between the surface of the first electrode coated with the dielectric material and the second electrode, wherein the first and second electrodes are configured to generate electric discharge which causes moisture of air passing through the electric discharge air path to be decomposed while air inside the casing circulates to pass through the electric discharge air path,
    wherein the condensation cover comprises an upper panel and a plurality of side panels that are configured to from a partitioned space in which the first and second electrodes are located, wherein the condensation cover comprises an opened bottom that is configured to allow air inside the casing to circulate into the partitioned space,
    wherein the condensation cover comprises a heat radiation surface, and is made of a material having higher thermal conductivity than that of the casing, and the first and second electrodes are spaced apart from inner surfaces of the plurality of side panels and the upper panel such that the moisture inside the casing is condensed on the inner surfaces of the plurality of side panels and the upper panel.

2. The apparatus of claim 1, wherein each of the first and second electrodes and the electric discharge air path is provided in plural.

3. The apparatus of claim 2, further comprising:
    a housing configured to hold edges of the first and second electrodes so that the plurality of first and second electrodes are arranged alternately to be parallel to each other.

4. The apparatus of claim 3, wherein the housing is provided with a first leg connected both to the first electrode and to the one electrode of the power source, and a second leg connected both to the second electrode and to the remaining electrode of the power source.

5. The apparatus of claim 1, wherein the first and second electrodes are provided parallel to each other in a plate shape.

6. The apparatus of claim 1, wherein the first and second electrodes are connected to the power source through the electric circuit board.

7. The apparatus of claim 1, wherein the condensation cover comprises a radiation fin that provides the heat radiation surface.

8. The apparatus of claim 1, wherein the condensation cover is made of a metal.

9. The apparatus of claim 1, wherein each of the first and second electrodes is provided with a plurality of ventilation holes.

10. The apparatus of claim 9, wherein the ventilation holes of the first and second electrodes are arranged alternately to be offset from each other.

11. The apparatus of claim 1, wherein the dielectric material is an ionomer.

12. The apparatus of claim 1, wherein the dielectric material is made by impregnating a polytetrafluoroethylene (PTFE) membrane with an ionomer.

* * * * *